Patented Aug. 28, 1951

2,565,518

UNITED STATES PATENT OFFICE 2,565,518

METHOD OF MAKING ABRASION-RESISTANT COATINGS

Norman R. Peterson and Robert L. Brown, Midland, Mich., assignors to The Dow Chemical Company, Midland, Mich., a corporation of Delaware No Drawing. Application November 25, 1949, Serial No. 129,522

3 Claims. (Cl. 260—23)

This invention relates to a method of making abrasion-resistant coatings which contain particular vinyl chloride-vinylidene chloride copolymers.

It is known that some polymers containing relatively large amounts of vinyl chloride in the polymer molecule, may be dissolved in certain active solvents for the polymers such as ketones, glycol ethers and the like, and that in such solutions they may be mixed with drying oils to form compositions which are apparently homogeneous. Such compositions have a low solids content at any viscosity suitable for coating operations, due to the high intrinsic viscosity of the polymeric substance. When attempts are made to increase the solids content, the polymer gels and, while this reduces the viscosity of the mixture, the product cannot deposit a continuous or useful coating. The need for large amounts of active solvent to provide a homogeneous solution is objectionable, further, because of the odor of the solution and the cost of the solvent. Such compositions accordingly have had little practical utility.

Because of the properties of the copolymers of vinyl chloride and vinylidene chloride, it would be desirable to provide a composition of such copolymers and drying oils which composition dries rapidly to form hard, abrasion-resistant, flexible coatings. It is accordingly an object of the present invention to provide a method of making such improved compositions from the copolymer of 50 to 90 per cent vinyl chloride and correspondingly 50 to 10 per cent of vinylidene chloride with low cost solvents and at high total solids.

It has now been found that the desired results may be obtained by first soaking a particular form of the copolymer in a mixture of drying oil and a volatile organic liquid having a swelling action on the copolymer but which does not dissolve the copolymer or form lyophilic gels therewith. The soaking step is followed, after a suitable interval, by a simple mixing or grinding operation which may be carried out in such standard equipment as a ball mill or a 3-roll paint mill.

The copolymer, which is useful in the present invention, is one containing from 50 to 90 per cent of vinyl chloride and correspondingly from 50 to 10 per cent of vinylidene chloride, which has been prepared by the polymerization of a mixture of the monomeric materials in aqueous emulsion. The product, so-obtained, consists of small friable aggregates, the individual particles of which have dimensions of the general order of one micron or less. Copolymers having the same analysis but produced either by the method of suspension polymerization (sometimes referred to as granular or "pearl" polymerization) or by the method of mass polymerization are not satisfactory for use in the present invention even though they may be ground to very fine particle sizes. Copolymers containing over 50 per cent vinylidene chloride and correspondingly less than 50 per cent vinyl chloride do not form the same type of useful compositions when treated in accordance with the present invention. The copolymer employed should be one whose viscosity rating, in centipoises, is from 0.9 to 1.4, as measured at 120° C. on a 2 per cent solution of the polymer, by weight, in orthodichlorobenzene.

Any vegetable oil which dries by oxidation upon exposure to air may be used, as may oil-modified alkyds having such drying characteristics. The preferred drying oils, for use in the invention, are blown linseed oil, blown soyabean oil, liquefied or heat-bodied oiticica oil and oil-modified alkyd resins. Other satisfactory oils include either raw or boiled linseed or soyabean oils, raw tung oil and solutions of oil-soluble varnish resins with one of the foregoing drying oils. Oils which have been used but with less general satisfaction are the heat-bodied forms of linseed, soyabean and tung oils. These last three oils may be used in minor amounts mixed with one or more of the more satisfactory oils listed above.

The non-solvent swelling agent for use in the invention should be one or a mixture of volatile organic liquids which does not dissolve or form lyophilic gels with the copolymer employed. This liquid should be sufficiently volatile to evaporate completely from deposited coatings of the composition when exposed to air. Preferred mixtures for use as swelling agents consist of from 30 to 70 per cent of a volatile aromatic hydrocarbon, such as xylol or toluol, and correspondingly from 70 to 30 per cent of a volatile aliphatic hydrocarbon, such as varnish makers and painters naphtha or one of those petroleum fractions known as "mineral spirits," benzine or "troluoil"—the latter being a fraction having an evaporation rate, approximately equal to that of toluene.

The various named constituents of the new coatings are employed in the following ranges of proportions by weight:

Drying oil, 50–90% (65–75% preferred).
Copolymer, 50–10% (35–25% preferred).
Volatile swelling agent, 5–200% of the total weight of oil and copolymer.

When the amount of oil employed is less than the amount of the copolymer, the product obtained by the present method is not as homogeneous and does not form the flexible and wear-resistant coatings which result from the use of the recited proportions. Similarly, when the ratio of oil to polymer exceeds 90:10, the product does not give the hardness and wear-resistance desired here. It is to be understood that the quantity of the swelling agent employed may vary considerably depending upon the viscosity of the oil, the presence or absence of pigments in the composition and the consistency desired for the type of coating operation to be employed. The composition may contain pigments, dyes, fillers, driers or stabilizers such as are commonly used in paints and other coatings.

The following examples illustrate the practice of the invention and disclose specific coating compositions and their uses.

Example 1

A mixture was prepared containing each of the following constituents in the indicated proportions by weight:

| | Parts |
|---|---|
| Blown soyabean oil (D+ viscosity) | 70 |
| Copolymer of 75% vinyl chloride–25% vinylidene chloride prepared in aqueous emulsion, coagulated and dried (viscosity 1.1) | 30 |
| Titanium dioxide | 100 |
| Xylene | 12.5 |
| Mineral spirits | 12.5 |
| Cobalt naphthenate | 0.1 |
| Lead naphthenate | 0.5 |

This mixture was ground in a pebble mill for 16 hours and produced a smooth, homogeneous, free-flowing paint. This composition was tested on a "fineness-of-grind gauge" and gave a reading of 4–5, indicating a maximum particle size of 0.002 inch. The composition was applied as a thin layer of top dressing to a commercial oilcloth which was then dried for 2 hours at 200° F. and then 8 hours at 120° F. The product exhibited a high gloss and was both wear-resistant and flexible.

Example 2

30 parts by weight of the same batch of copolymer as was employed in Example 1 was soaked for 16 hours in a mixture of 525 parts of blown soyabean oil (Z–4 viscosity), 175 parts of heat-bodied oiticica oil and 120 parts of a hydrogenated, partially aromatic petroleum distillate known commercially as "Solvesso No. 3." The polymer was not dissolved by the soaking treatment but was swelled appreciably. 50 parts of titanium dioxide, 50 parts of a paint grade of calcium carbonate and small amounts of cobalt and lead driers were added, and the resulting mixture was passed three times through a 3-roll paint mill. A smooth, free-flowing paint with a fineness rating of 4–5 was obtained. This rapid drying material gave hard and wear-resistant, though flexible, gloss coatings to oilcloth.

Example 3

Another oilcloth coating which can be dried completely in 1 hour at 200° F. after factory application, and which is especially resistant to cracking when folded or creased, was prepared in the manner described in Example 2. The composition consisted of 70 parts of a long oil soyabean alkyd resin, 20 parts of a raw soyabean oil, 30 parts of the same copolymer, 50 parts of titanium dioxide, 30 parts of mineral spirits and 40 parts of the hydrogenated, partially aromatic petroleum product, Solvesso No. 3. Small amounts of driers were present as before.

Example 4

An abrasion-resistant, wear layer for felt-base floor coverings of the "linoleum" type was produced by the procedure set forth in Example 2 from the following ingredients:

| | Parts |
|---|---|
| Blown soyabean oil (D+ viscosity) | 70 |
| 75% vinyl chloride–25% vinylidene chloride copolymer (viscosity 0.95) | 30 |
| A paint grade of calcium carbonate | 70 |
| Titanium dioxide | 20 |
| Coarse zinc oxide | 10 |
| Xylene | 12.5 |
| Mineral spirits | 12.5 |
| Cobalt and lead naphthenates, as before. | |

NOTE: The oil viscosities reported in Examples 1, 2 and 4 are measured on the Gardner-Holdt scale.

Example 5

A cloth coating suitable for the production of highly abrasion-resistant, artificial leather was produced as described in Example 2 from the following materials:

| | Parts |
|---|---|
| Vinyl chloride-vinylidene chloride copolymer (viscosity 1.0) | 30 |
| Long oil soyabean alkyd resin | 70 |
| Dark chrome green pigment | 6.25 |
| Prussian blue pigment | 15 |
| Titanium dioxide | 12.5 |
| Zinc oxide | 1.25 |
| Solvesso No. 3 | 40 |
| Mineral spirits | 30 |
| Cobalt naphthenate | .03 |
| Lead naphthenate | .3 |

Each of the described coating compositions prepared in accordance with the present invention gave hard and wear-resistant coatings which dried to a tack-free condition in much shorter periods of time than do many of the compositions being used commercially for similar purposes.

The same type of results were obtained when the copolymer employed was one containing 50 to 90 per cent of vinyl chloride and correspondingly 50 to 10 per cent of vinylidene chloride, though the high vinylidene chloride end of the range tended to disperse with greater difficulty than the copolymer of the examples, while a similar difficulty was noticeable at the high vinyl chloride end of the recited copolymer range.

The compositions are of particular interest in the preparation of oilcloth, linoleum type of floor coverings, and artificial leather since the shortened drying procedure made possible by these compositions results in a large potential increase of the production of such products using the present equipment. The limiting factor in the production of many such types of coated fabrics is the capacity of the large ovens and drying rooms which have been made necessary by the prolonged duration of the tacky condition of the conventional oil coatings.

We claim:

1. The method which comprises mixing from 10 to 50 parts by weight of an emulsion-produced copolymer of 50 to 90 per cent vinyl chloride and correspondingly 50 to 10 per cent vinylidene chloride, said copolymer having a viscosity rating in centipoises of from 0.9 to 1.4, measured at 120° C. on a 2 per cent solution of the polymer, by weight, in orthodichlorobenzene, with from 50 to 90 parts of a vegetable drying oil and from 5 to 200 parts of a volatile organic liquid which swells but does not dissolve or form lyophilic gels with the copolymer, and after the copolymer has become swollen in such a mixture, subjecting the whole to a grinding operation to produce physical homogeneity.

2. The method which comprises mixing from 10 to 50 parts by weight of an emulsion-produced copolymer of 50 to 90 per cent vinyl chloride and correspondingly 50 to 10 per cent vinylidene chloride, said copolymer having a viscosity rating in centipoises of from 0.9 to 1.4, measured at 120° C. on a 2 per cent solution of the polymer, by weight, in orthodichlorobenzene, with from 50 to 90 parts of a vegetable drying oil and from 5 to 200 parts of a mixture of from 30 to 70 per cent volatile aromatic hydrocarbons and correspondingly 70 to 30 per cent of volatile aliphatic hydrocarbons, and after the copolymer has become swollen in such a mixture, subjecting the whole to a grinding operation to produce physical homogeneity.

3. The method which comprises mixing from 25 to 35 parts by weight of an emulsion-produced copolymer of 50 to 90 per cent vinyl chloride and correspondingly 50 to 10 per cent vinylidene chloride, said copolymer having a viscosity rating in centipoises of from 0.9 to 1.4, measured at 120° C. on a 2 per cent solution of the polymer, by weight, in orthodichlorobenzene, with from 75 to 65 parts of a vegetable drying oil and from 5 to 200 parts of a mixture of from 30 to 70 per cent volatile aromatic hydrocarbons and correspondingly 70 to 30 per cent of volatile aliphatic hydrocarbons, and after the copolymer has become swollen in such a mixture, subjecting the whole to a grinding operation to produce physical homogeneity.

NORMAN R. PETERSON.
ROBERT L. BROWN.

No references cited.